(12) United States Patent
Schwartz et al.

(10) Patent No.: US 9,529,843 B2
(45) Date of Patent: Dec. 27, 2016

(54) HIGHLY PORTABLE AND DYNAMIC USER INTERFACE COMPONENT TO SPECIFY AND PERFORM SIMPLE TO COMPLEX FILTERING ON DATA USING NATURAL LANGUAGE-LIKE USER INTERFACE

(75) Inventors: Daniel Schwartz, San Francisco, CA (US); Theresa Hickman, Mountain View, CA (US); Nigel Smith, Redwood City, CA (US); Earl Cornell, legal representative, Volcano, HI (US); Ritchard Shadian, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 40 days.

(21) Appl. No.: 13/224,412

(22) Filed: Sep. 2, 2011

(65) Prior Publication Data

US 2013/0061161 A1    Mar. 7, 2013

(51) Int. Cl.
| | | |
|---|---|---|
| G06F 17/00 | (2006.01) | |
| G06F 17/30 | (2006.01) | |
| G06Q 10/10 | (2012.01) | |
| G06Q 40/00 | (2012.01) | |

(52) U.S. Cl.
CPC ........ *G06F 17/30398* (2013.01); *G06Q 10/10* (2013.01); *G06Q 40/00* (2013.01)

(58) Field of Classification Search
None
See application file for complete search history.

(56) References Cited

U.S. PATENT DOCUMENTS

| | | | |
|---|---|---|---|
| 2003/0050877 A1* | 3/2003 | Blasnik et al. | 705/30 |
| 2004/0032432 A1* | 2/2004 | Baynger | 345/810 |
| 2007/0061746 A1* | 3/2007 | Folting et al. | 715/764 |
| 2009/0144606 A1* | 6/2009 | Vignet | 715/227 |
| 2010/0083151 A1* | 4/2010 | Lanza et al. | 715/764 |

* cited by examiner

*Primary Examiner* — Keith Bloomquist
(74) *Attorney, Agent, or Firm* — Kilpatrick Townsend & Stockton LLP

(57) ABSTRACT

Embodiments of the invention provide systems and methods for filtering a complex dataset. More specifically, embodiments of the present invention provide for using a filter implemented as a single, re-usable component of a user interface to specify and perform filtering on a complex dataset. For example, embodiments described herein can provide a consistent user interface for navigating and filtering the complex dataset that includes tree management. Embodiments also provide a single, reusable, componentized widget for declaring filters against the complex dataset. Additionally, or alternatively, embodiments described herein allow filters to be shared across portions of the dataset, e.g., across ledgers, across the dataset, e.g., across charts of accounts, applications, e.g., different financial applications, across pillars, etc.

19 Claims, 14 Drawing Sheets

| Account | | | | | x |
|---|---|---|---|---|---|
| Segments | | | | | |

Match ● All ○ Any

| | | | | | |
|---|---|---|---|---|---|
| Company | Equals ▾ | 01 ▾ | | | |
| Department | Equals ▾ | 000 ▾ | | | |
| Account | Equals ▾ | 1110 ▾ | ─ 535 | ─ 540 | |
| 530 ─ Sub Account | Between ▾ | 0000 ▾ | 9999 ▾ | ✕ | |
| Product | Equals ▾ | 000 ▾ | ✕ | | |

*500*

[ Add Segments ▾ ] [ Reset ] [ Cancel ] [ OK ]

Define Journal Line Allocation

Rule: FR JR 1 — 905
Chart of Accounts: France Accounting — 910
Account Type: Expense — 915

Account Range — 920

Match ● All ○ Any       900

| Account | Offset |
|---|---|
| CO Equals 10; SA Equ... | 104300 |
| CO Equals 10; SA Equ... | 104876 |
| CO Equals 10; SA Equ... | 104806 |
| CO Equals 10; SA Equ... | 104906 |
| CO Equals 10; SA Equ... | 104596 |

Define Journal Line Allocation

Rule [ FR JR 1 ] — 1005
Chart of Accounts [ France Accounting ] — 1010
Account Type [ Expense ▾ ] — 1015

| | Line | Description |
|---|---|---|
| ⊟ | 1 | Lorem ipsum dolor sit amet, consectetuer adipiscing elit. Quisque posuere fringilla dui. |

Cost Center Range
Match ● All ○ Any
Actions ▾ View ▾ ✚ ✗ 🏷 ☐ Maximize

Segments — 1025
Match ● All ○ Any

| | | | | |
|---|---|---|---|---|
| Company | Between ▾ | 01 🔍 | – | 99 🔍 |
| Department | Between ▾ | 000 🔍 | – | 999 🔍 |
| Account | Between ▾ | 1110 🔍 | – | 9999 🔍 ✗ |
| Sub Account | Between ▾ | 0000 🔍 | – | 8888 🔍 ✗ |
| Product | Between ▾ | 000 🔍 | – | 666 🔍 ✗ |

[ Add Segments ▾ ] [ Reset ]

1035 / 1030

| | | |
|---|---|---|
| ⊞ | 2 | Lorem ipsum dolor sit amet, consectetuer adipiscing elit. Quisque posuere fringilla dui. |
| ⊞ | 3 | Lorem ipsum dolor sit amet, consectetuer adipiscing elit. Quisque posuere fringilla dui. |
| ⊞ | 4 | Lorem ipsum dolor sit amet, consectetuer adipiscing elit. Quisque posuere fringilla dui. |

Define Journal Line Allocation

Rule: FR JR 1
Chart of Accounts: France Accounting
Account Type: Expense

Cost Center Range

Match: ● All  ○ Any

Actions: 1110, 1115, 1120, 1125, 1130 — Maximize

| Segments | Condition | Value | To Value | Description |
|---|---|---|---|---|
| ⬚— KFF Filter 1 | | | | |
| Match: ● All ○ Any | | | | |
| Department | Between | 000 | 999 | Lorem ipsum dolor sit amet |
| Account | Between | 1110 | 9999 | Lorem ipsum dolor sit amet |
| Sub Account | Between | 0000 | 8888 | Lorem ipsum dolor sit amet |
| Product | Between | 000 | 666 | Lorem ipsum dolor sit amet |
| ⊞— KFF Filter 2 | | | | |
| ⊞— KFF Filter 3 | | | | |

HIGHLY PORTABLE AND DYNAMIC USER INTERFACE COMPONENT TO SPECIFY AND PERFORM SIMPLE TO COMPLEX FILTERING ON DATA USING NATURAL LANGUAGE-LIKE USER INTERFACE

BACKGROUND OF THE INVENTION

Embodiments of the present invention relate generally to methods and systems for filtering a complex dataset and to using a filter implemented as a single, re-usable component of a user interface to specify and perform filtering on a complex dataset.

Various types of applications such as enterprise applications, for example, utilize datasets that can be considered complex. That is, these datasets can include not only data but can also include or be arranged in a hierarchy. Additionally, these applications typically provide mechanisms for filtering the dataset based on user defined criteria in order to generate reports or otherwise provide data from the dataset to the user based on the criteria. For example, in past releases, Oracle Applications and PeopleSoft Enterprise application solutions had numerous user interface solutions to support filtering of datasets in order to specify simple to complex ranges of values. Particularly, such solutions were used to specify filters on a dataset called Chart of Accounts (COA). In Oracle e-Business Suite and Fusion Applications, the Accounting Flexfield is the name for the list of segments and account values that make up the chart of accounts. In PeopleSoft Enterprise, ChartFields is the term used to mean the COA.

The Chart of Accounts is the underlying structure for organizing financial information that impacts many areas, such as transaction processing, reporting, analytics, and internal controls. The list of accounts can be numerical, alphabetic, or alpha-numeric. For example, to denote the type of travel expenses incurred by an organization, one could define an account for meals expenses to 6120, lodging 6130, airfare 6150, etc. Then, to identify which department or line of business incurred those expenses, one could define another set of department accounts, such as Sales to be department value 1A0, Marketing to be 2A0, Finance to be 3B0 to, R&D to be 4B0, and so on. Many companies (customers) will use other segments in their COA to identify other aspects of their business and transactions, such as company, product line, and region that incurred a particular expense or revenue. By organizing the COA this way, it helps to identify the nature of transactions during transaction processing, reporting, analytics, and so on. The filtering mechanism seeks to identify one to many results from a COA based on a set criteria (segments, conditions, and segment values) entered.

However, past filtering mechanisms were subject to several significant limitations. For example, past filtering mechanisms were custom and multiple solutions were needed to provide filtering on the COA depending on what needed to be achieved, e.g., navigating and filtering across trees, ranges and/or values. Additionally, past filtering mechanisms were hard to leverage across different products as different UI solutions were needed for different filtering needs. Furthermore, past filtering mechanisms involved complex user interface solutions, even for simple filters, which were difficult to use and hard to interpret by those users not familiar with the interface. Past filtering mechanisms used complex syntax and terminology for input and description of the filter. Also, past filtering mechanisms showed all required and optional fields from the data set making it harder and slower to enter just what data is needed. Hence, there is a need for improved methods and systems for specifying and performing different types of filtering on a complex dataset.

BRIEF SUMMARY OF THE INVENTION

Embodiments of the invention provide systems and methods for filtering a complex dataset. More specifically, embodiments of the present invention provide for using a filter implemented as a single, re-usable component of a user interface to specify and perform filtering on a complex dataset. According to one embodiment, a method for filtering a complex dataset can comprise providing by a computer system a filter widget control in a user interface for an application. The filter widget control can be related to a filter widget comprising a single, re-usable component for initiating a combination filter. For example, providing the filter widget control in the user interface for the application can comprise displaying a syntax of current filter conditions in an abbreviated format. In such cases, details of the current filter conditions may be displayed in a hover window of the user interface in response to a selection of the current filter conditions.

A selection of the filter widget control can be received at the computer system through the user interface and the user interface can be updated with the filter widget for receiving filter conditions for applying the combination filter to the complex dataset. For example, updating the user interface with the filter widget for receiving the filter conditions can comprise displaying a dialog box including elements for selection of the filter conditions. In another example, updating the user interface with the filter widget for receiving the filter conditions can comprise displaying elements for selection of the filter conditions embedded in a table of the user interface. In yet another example, updating the user interface with the filter widget for receiving the filter conditions can comprise displaying elements for selection of the filter conditions embedded in a hide/show region of the user interface. In these examples, updating the user interface with the filter widget for receiving filter conditions for applying the combination filter to the complex dataset can comprise updating the user interface dynamically at the time of instantiating the user interface. Updating the user interface dynamically can be based on a model for the complex dataset, a hard-coded definition of the complex dataset, or a combination of a model for the complex dataset and a hard-coded definition of the complex dataset.

One or more filter conditions can be received at the computer system through the updated user interface. For example, the one or more filter conditions can comprise a selected natural language-like condition. The combination filter can be applied to the dataset by the computer system using the one or more filter conditions. The complex dataset can comprise data and a hierarchy of the data within the complex dataset. In such cases, a determination can be made by the computer system whether the filter conditions include tree filtering conditions for filtering the complex dataset based on the hierarchy of the complex dataset. In response to determining the filter conditions include tree filter conditions, the user interface can be updated by the computer system for receiving the tree filter conditions. The tree filter conditions can be received at the computer system through the updated user interface. Receiving the tree filter conditions can comprise receiving an indication of a selected natural language-like condition. Applying the combination filter to the dataset by the computer system can be performed using the one or more filter conditions and the tree filter conditions.

According to another embodiment, a system can comprise a processor and a memory communicatively coupled with and readable by the processor. The memory can have stored therein a sequence of instruction for filtering a complex dataset which, when executed by the processor, causes the processor to provide a filter widget control in a user interface for an application. The filter widget control can be related to a filter widget comprising a single, re-usable component for initiating a combination filter. A selection of the filter widget control can be received through the user interface and the user interface can be updated with the filter widget for receiving filter conditions for applying the combination filter to the complex dataset. One or more filter conditions can be received through the updated user interface. Receiving the one or more filter conditions can comprise receiving an indication of a selected natural language-like condition. The combination filter can be applied to the dataset by the computer system using the one or more filter conditions.

The complex dataset can comprise data and a hierarchy of the data within the complex dataset. Additionally, the filter conditions can include tree filtering conditions for filtering the complex dataset based on the hierarchy of the complex dataset. In response to determining the filter conditions include tree filter conditions, the user interface can be updated for receiving the tree filter conditions and the tree filter conditions can be received through the updated user interface. Updating the user interface with the filter widget for receiving filter conditions for applying the combination filter to the complex dataset can comprise updating the user interface dynamically at the time of instantiating the user interface and/or throughout usage of the user interface and updating the user interface dynamically can be based on a model for the complex dataset, a hard-coded definition of the complex dataset, or a combination of a model for the complex dataset and a hard-coded definition of the complex dataset. Receiving the tree filter conditions can comprise receiving an indication of a selected natural language-like condition. The combination filter can be applied to the dataset using the one or more filter conditions and the tree filter conditions.

BRIEF DESCRIPTION OF THE DRAWINGS

FIGS. 5A-5C are exemplary user interfaces including dialog boxes for specifying filter criteria according to various alternative embodiments of the present invention.

FIG. 7 is an exemplary user interface including a filter dialog box according to an alternative embodiment of the present invention.

FIG. 8 is an exemplary user interface including a filter dialog box according to another alternative embodiment of the present invention.

FIG. 9 is an exemplary user interface including a filter dialog box according to yet another alternative embodiment of the present invention.

FIG. 10 is an exemplary user interface including a filter widget embedded in a hide/show region according to another alternative embodiment of the present invention.

FIG. 11 is an exemplary user interface including a filter widget implemented as an embedded re-usable table according to yet another alternative embodiment of the present invention.

DETAILED DESCRIPTION OF THE INVENTION

Figure 1:
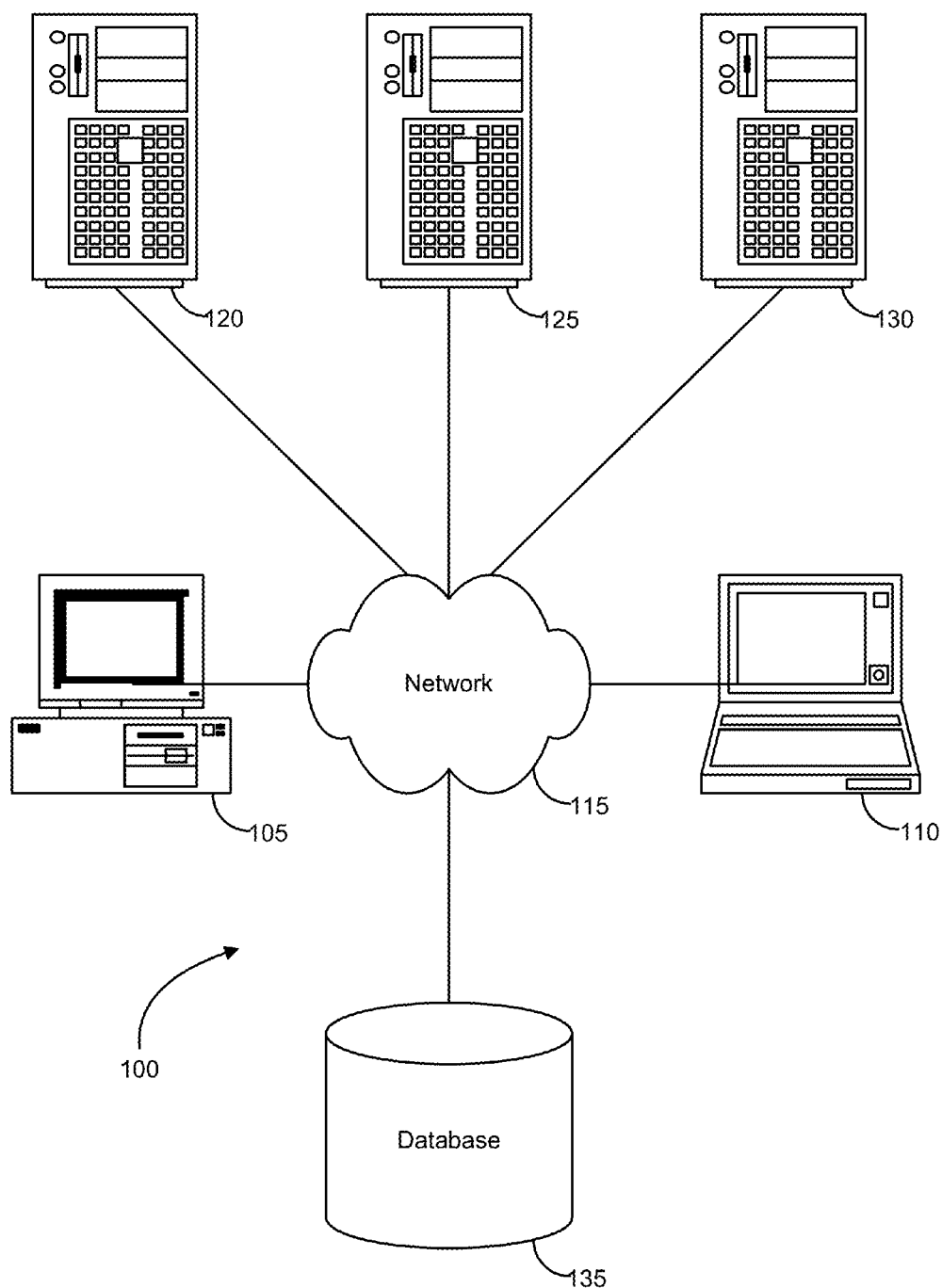
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for filtering a complex dataset. More specifically, embodiments of the present invention provide for using a filter implemented as a single, re-usable component of a user interface to specify and perform filtering on a complex dataset. For example, embodiments described herein can provide a consistent user interface for navigating and filtering the complex dataset that includes tree management. Embodiments also provide a single, reusable, componentized widget for declaring filters against the complex dataset. Additionally, or alternatively, embodiments described herein allow filters to be shared across portions of the dataset, e.g., across ledgers, across the dataset, e.g., across charts of accounts, applications, e.g., different financial applications, across pillars, etc. However, it should be noted that, while reference is made herein to particular types of datasets such as charts of accounts and particular types of applications and examples of those types of applications such as particular enterprise applications, embodiments of the present invention should not be considered to be so limited. Rather, these examples are provided for illustrative purposes only and embodiments of the present invention are believed to be equally applicable to any of a wide variety of datasets and applications.

According to one embodiment, segments of a Chart of Accounts (COA) or other dataset can be available to be used and visible in the filter based on a defined model. This model, once defined, can be both edited and extended to include different segments or other segments from other data sources respectively. When segments are added to the filter, they may query the model in this instantiation to determine what segments are available. Thus, if the model changes, the view (i.e., the filter UI) can be dynamically updated to support those changes. Regardless of how segments are derived, the UI can dynamically change to display segments and their associated condition and value fields. When model-driven, a setup interface may be provided to seed segments, conditions, and values to define the filters at the model level which can then be used in the user interface. In another embodiment, segments represented in the user interface can be defined in some other hard-coded way, e.g., through a front-end or user interface for an application where segments, values, and conditions are hardcoded in a page in which the filter is presented. In yet another embodiment, a combination of a model driven and hard-coded approach to identifying and/or defining segments represented in the user interface may be utilized.

In cases where embodiments of the present invention utilize a model for the dataset, such a model may be implemented as described in U.S. patent application Ser. No. 11/970,941 filed Jan. 8, 2008 by Saxena et al. and entitled "Model-Driven Database Query" the entire content of which is incorporated herein by reference for all purposes. As described therein, the model is a domain-specific representation of the information that an application operates or utilizes. Domain logic adds meaning to raw data, which in one embodiment is the data stored on a database or other repository. The view renders the model into a form suitable for interaction, typically a user interface element or component. Multiple views can exist for a single model for different purposes. The controller processes and responds to events, typically user actions, and may invoke changes on the model. The user interface of the present invention can utilize such a model to provide a dynamic collection of views of the data represented by the model and based on the context for the data as defined in that model to facilitate a dynamic, contextual filter widget for defining conditions of a combination filter. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
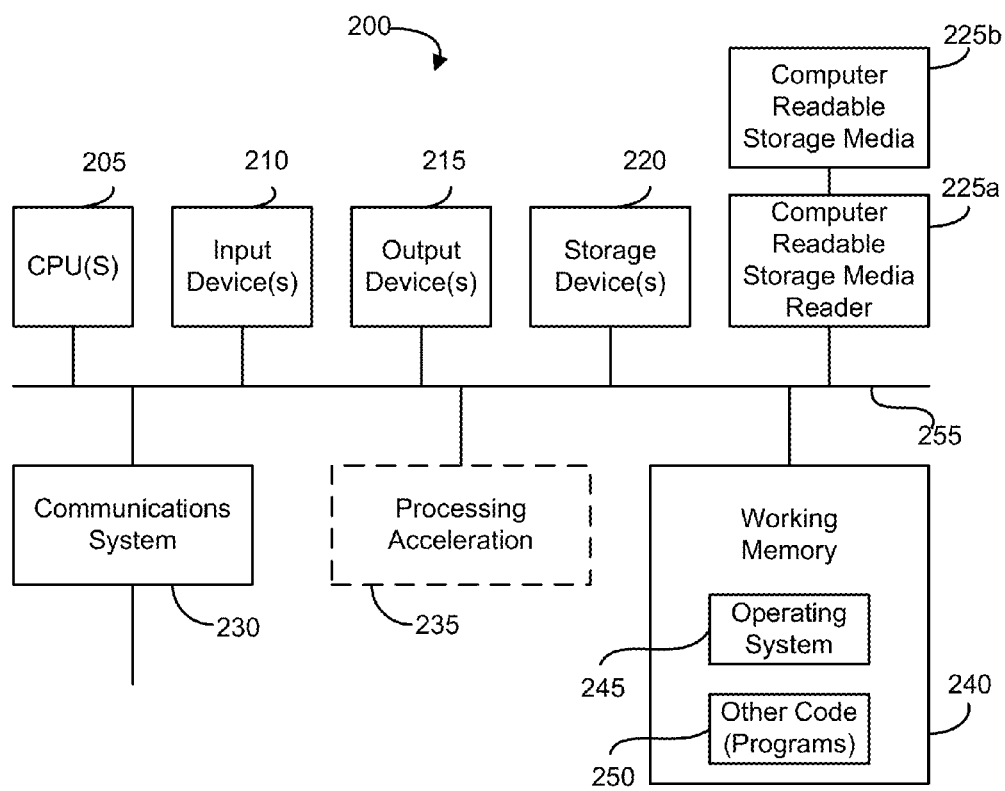
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
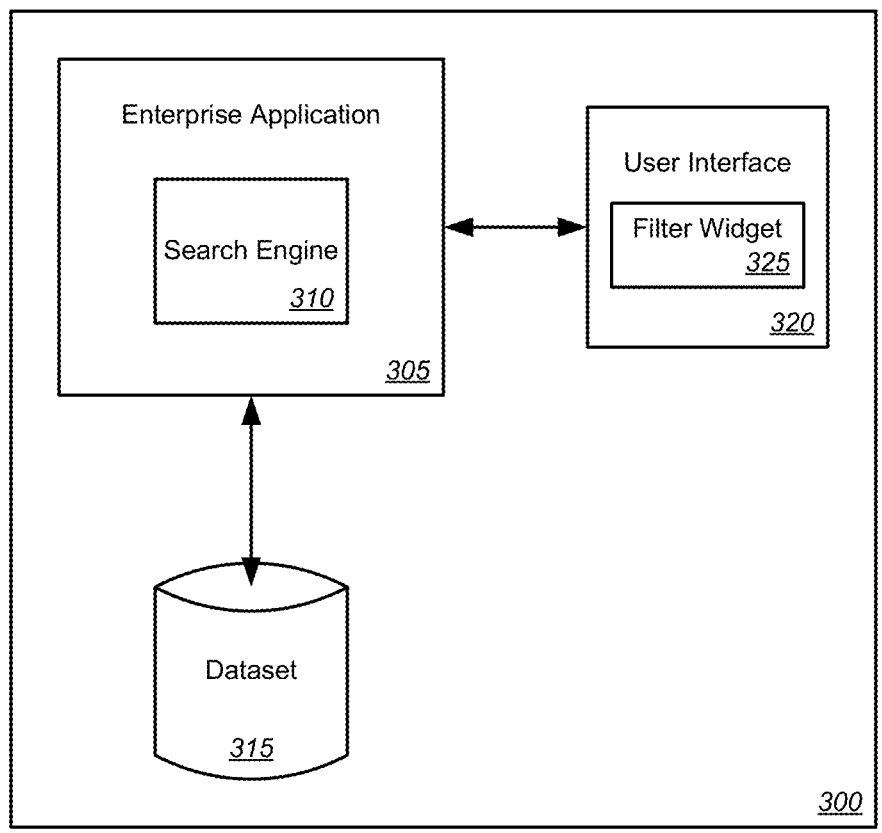
FIG. 3 is a block diagram illustrating, at a high-level, functional components of a system for providing a user interface including a combination filter widget and for filtering a complex dataset according to one embodiment of the present invention.

FIG. 3 is a block diagram illustrating, at a high-level, functional components of a system for providing a user interface including a combination filter widget and for filtering a complex dataset according to one embodiment of the present invention. In this example, a computer system 300, such as any of the systems described above, can execute an application 305 such as an enterprise application, e.g., Oracle Applications, PeopleSoft Enterprise application, etc. This application may maintain and access a dataset stored in one or more repositories 315. For example, the dataset can comprise a Chart of Accounts (COA) in Oracle Applications or ChartFields in PeopleSoft Enterprise. It should be understood that, while illustrated here as a single repository 315, the dataset may, depending upon the implementation, be stored in more than one repository. Additionally, while illustrated here as part of the computer system 300, the repository may be located outside of the computer system 300, within a different system, or distributed between multiple system.

The application 305 may also provide a user interface 320 such as one or more web pages or other interfaces that can be rendered by the system 300 or provided to another system, e.g., a client, for rendering thereon. Through this interface 320, a user of the application 305 can control and/or interact with the application 305. For example, the user can provide a set of criteria to be used by a search engine 310 of the application 305 to filter results of a search of the dataset. The search engine 310 can search data of the dataset from the repository 315 and return a report or other, different types of results based on this filtering, for example in the form of a web page, to be rendered by the user interface 320. It should be understood that not only are the results returned like a search engine, but the results can also serve as a single selection so to speak. So, instead of selecting one value for the filter, the filter value can represent all, or some subset of all of, those returned results.

According to one embodiment, an interface is provided that allows for navigating and filtering across trees, ranges and/or values of the dataset. More specifically, embodiments provide a single, reusable, consistent code line via a componentized filter widget 325 of the user interface 320 for declaring business rules and filters against the dataset that supports navigation and filtering of the dataset. Additionally, as will be described in greater detail below, the filter widget 325 also provides for selecting tree nodes to apply conditions on data trees (hierarchical data). Additionally filters with their conditions and values can be saved and shared across products.

Also as will be described in greater detail below, the interface provided by the filter widget can provide a common, dynamic search-style interface coupled with natural language, with internationalization support, for defining operators (for example, "Greater than" instead of ">"). This allows users to specify the different possible conditions within the same interface as the interface adapts to the specified operators and the respective values that need to be entered and their mechanism of entry. A current filter expression can be initially displayed in an abbreviated format and a read-only layer can also be provided so a user can quickly glance at what conditions have been defined. This is very useful for browsing multiple filters and their definition. Additionally, multiple "Any/All" groups for specifying criteria on multiple ranges can be supported as well to create nested filters of sorts but within the same primary filter. Other features provided by the interfaces through the filter widget 325 can include blank value entry support to reduce data entry errors and error corrections (e.g., users who are not familiar with the dataset values can enter blanks instead of wrong values), tree operators in addition to core operators (such as =, !=, <, >, between), filters to be saved back to product, ability to save filters for reuse, and multiple "Any/All" groups for search on multiple flex ranges. These and other features will be described in greater detail below with reference to FIGS. 4-14.

Stated another way, filtering a complex dataset can begin with providing a filter widget 325 embedded in a user interface 320 for an application 305. The filter widget 325 can comprise a single, re-usable component for initiating a combination filter. As will be seen, providing the filter widget 325 embedded in the user interface 320 for the application 305 can comprise displaying a syntax of current filter conditions in an abbreviated format. In such cases, details of the current filter conditions can be displayed in a hover window of the filter widget 325 within the user interface 320 in response to a selection of the current filter conditions, e.g., upon a mouse-over on the filter widget 325, a focus on the filter widget 325 by manipulation of arrow keys, a tab key, or other keys of a keyboard, or other event. A selection of the filter widget 325 can also be received through the user interface 320, e.g., upon a click or other event. The user interface 320 can be dynamically and contextually updated, for example through a dialog window of the filter widget 325 or through a table embedded in the user interface 320, based on a definition of the dataset, e.g., through a model for the data set, through a hard-coded definition of the dataset, or through a combination of a model and code defining the dataset, and one or more filter conditions for applying the combination filter to the complex dataset can be received through the filter widget 325 of the updated user interface 320.

For example, updating the filter widget 325 of the user interface 320 for receiving the filter conditions can comprise displaying a dialog box including elements for selection of the filter conditions. In another example, updating the filter widget 325 of user interface 320 for receiving the filter conditions can comprise displaying elements for selection of the filter conditions embedded in a table of the user interface 320. In yet another example, updating the filter widget 325 of user interface 320 for receiving the filter conditions can comprise displaying elements for selection of the filter conditions embedded in a hide/show region of the user interface 320. Also as illustrated in the figures and discussed below, receiving the one or more filter conditions can comprise receiving an indication of a selected natural language-like condition.

As noted, the complex dataset can comprise data and a hierarchy of the data within the complex dataset. The dataset and the hierarchy may be defined by a model, may be hard-coded in an application, or defined by some combination of a model and hard-coding or configuration of an application. The user interface of the present invention provides for dynamically presenting filters for the data based on this model, hard-coding, or other representation of the dataset and the hierarchy thereof. That is, the elements displayed, the conditions available, etc., can be provided dynamically based on a model for and/or a hard-coded definition of the dataset. So for example, if the filter conditions include tree filter conditions, filter widget 325 and the user interface 320 can be dynamically updated for receiving the tree filter conditions. The tree filter conditions can be received through filter widget 325 of the updated user interface 320. Again, dynamically updating the user interface 320 for receiving the filter conditions can comprise displaying a dialog box including elements for selection of the filter conditions, displaying elements for selection of the filter conditions embedded in a table of the user interface, or displaying elements for selection of the filter conditions embedded in a hide/show region of the user interface. In some cases, the tree filter conditions can comprise one or more conditions for selecting specific nodes from the hierarchy of the dataset. Such conditions for selecting specific nodes from the hierarchy of the dataset may further include multi-select conditions. Once the various conditions have been received, the combination filter can be applied to results of a search of the dataset by the search engine 310 of the application 305 using the one or more filter conditions and results, e.g., a report or other results, can be returned and display or otherwise rendered in the user interface 320.

FIGS. 4-14 provide numerous exemplary interfaces illustrating implementations of the various embodiments of the present invention. These interfaces are provided for illustrative purposes only to provide a more thorough understanding of these embodiments and are not intended to limit the scope of the present invention. Rather, it should be understood that various other user interfaces, differing in many visual as well as functions aspects, may also be utilized with various embodiments of the present invention, depending upon the exact implementation and without departing from the spirit or scope of the present invention.

Figure 4A:
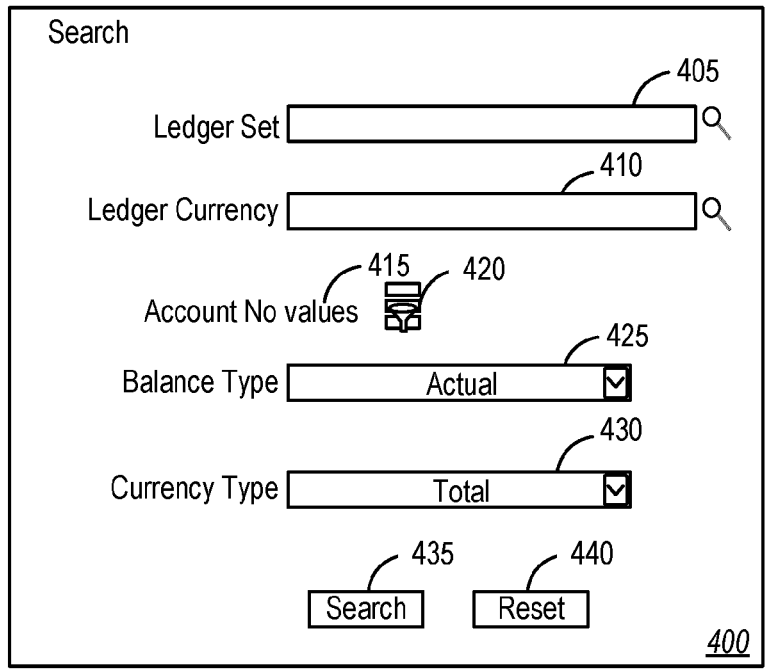
FIGS. 4A and 4B are exemplary user interfaces including a filter widget according to one embodiment of the present invention.
Figure 4B:
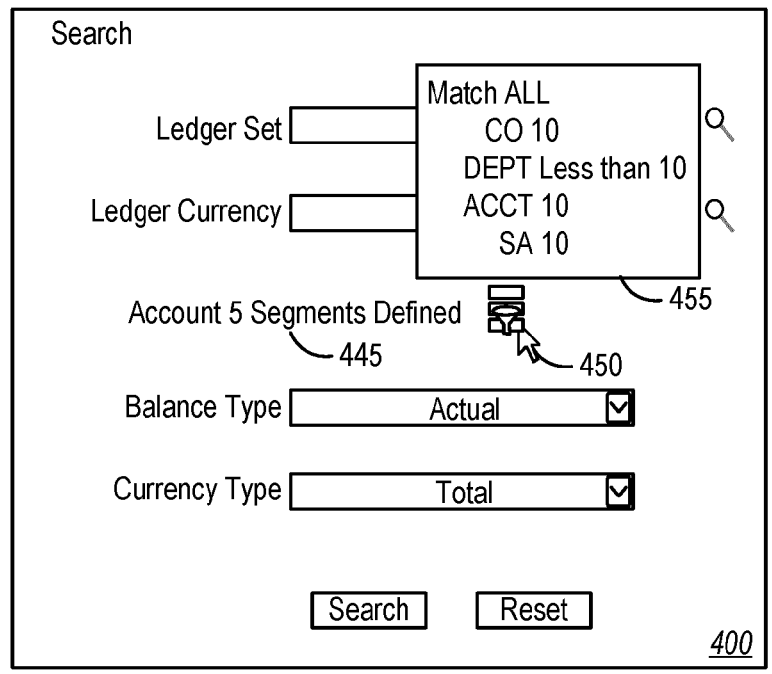

FIGS. 4A and 4B are an exemplary user interfaces including a filter widget according to one embodiment of the present invention. This example includes a user interface 400 such as a "search" page or other web page that includes a number of elements 405-440 for defining and executing a search of the dataset. For example, the elements 405-440 can include text boxes 405 and 410 and choice lists 425 and 430 for entering search criteria and buttons 435 and 440 for controlling the search. The dialog box can also include a filter widget control 420 in the form of an icon (as illustrated here) or as a button, a button/icon, sometimes referred to as a "butcon," hyperlink or other element. The dialog box can also include a textual or other indication 415 of a current filter if any is yet defined. The filter widget control 420 as represented here includes a label, a butcon, and a dialog box. It should be understood that, while not represented here, different implementations of the widget may comprise other arrangements. For example, there may also be a dialog box to select a segment's value. This dialog may change depending on whether it is a tree condition or not. In other implementations, the control 420 may include various combinations of one or more of a label, a value, a butcon, a dialog, a hyperlink and/or a hover layer.

As noted above, a current filter expression can be initially displayed in an abbreviated format and a read-only layer can also be provided so a user can quickly glance at what conditions have been defined. This is very useful for browsing multiple filters and their definition. Thus, FIG. 4A illustrates a text description 415 indicating that no current filter is defined. However, FIG. 4B illustrates an abbreviated description 445 indicating a current filter. For example, the abbreviation may indicate only the number of segments of conditions defined for the current filter. Upon a selection of the filter widget control 420, e.g., by "hovering" over the icon with a mouse pointer 450 or by otherwise indicating or selecting the widget, a hover window 455 can be opened or displayed which includes a more complete list and/or description of the filter criteria including values and conditions for defined segments. In other implementations, the abbreviated description 445 may include a list of defined segments and up to some definable number of characters of the filter criteria for each segment. Again, variations are contemplated and considered to be within the scope of the present invention.

Figures 5A, 5B:
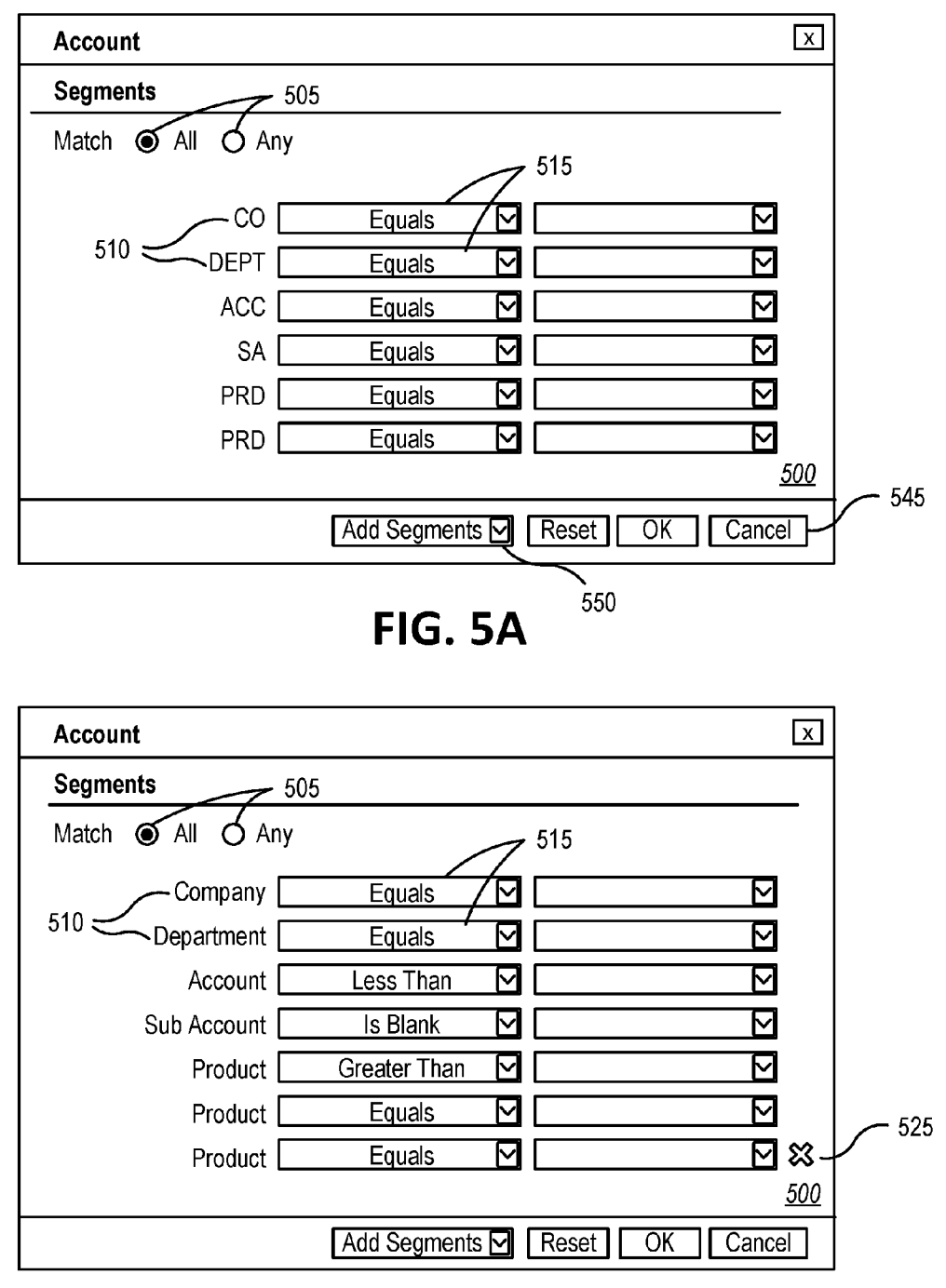

FIGS. 5A-5C are exemplary user interfaces including dialog boxes for specifying filter criteria according to various alternative embodiments of the present invention. More specifically, these examples illustrate a dialog box 500 such as may be opened upon a user clicking an icon, button, butcon, etc. for or otherwise selecting the filter widget control described above. As illustrated in FIG. 5A, the dialog box 500 can include a set of radio buttons 505 for selecting an "All/Any" criteria, i.e., for indicating whether the filter should match all or any of the specified conditions. The dialog box 500 here also includes a list of segments 510 and one or more choice lists 515 for each segment through which criteria for that segment may be defined. Segments may be represented by default according to a model for a data source of the segments. In other cases, the segments may be presented based on a hardcoded definition of the dataset or by some combination of a model and hard-coded definition. In some cases, a blank dialog may be permitted by the model or definition and presented through which the user can add segments themselves. In other cases, again depending on the model or definition of the dataset, some segments can appear by default where some of the default segments may be removable and some may be required and cannot be removed, e.g., the segment may be required if used as a key or index field. The dialog box 500 can also include a set of buttons 545 or other elements for controlling entry of the criteria. For example, the buttons 545 may include an "Add Segments" button 550 for adding to the set of default, pre-defined, or otherwise previously displayed list of segments 510.

FIG. 5B includes the dialog box 500 but with the list of segments 510 in a slightly different format. Additionally, FIG. 5B includes an icon 525 or other control, e.g., a button, hyperlink, etc., for removing segments from the list of segments 510. In some cases, such an icon 525 or control may be added to the dialog box 500 for all segments or only some segments such as those added by the user, e.g., using the "Add Segments" button 550.

As illustrated by FIG. 5C, ranges can also be defined and along with other filter conditions. For example, for a segment 530 for which a range criteria has been selected, a set of choice lists 535 and 540 for defining the range can also be displayed in the dialog box 500. Thus, the different implementations of the dialog box 500 provide access to operators and conditions for filtering through a single, re-usable interface. According to one embodiment, the conditions available for each segment can be based on the defined data for that segment, e.g., based on data type etc. and again, based on a model and/or code defining the dataset.

Figure 6A:
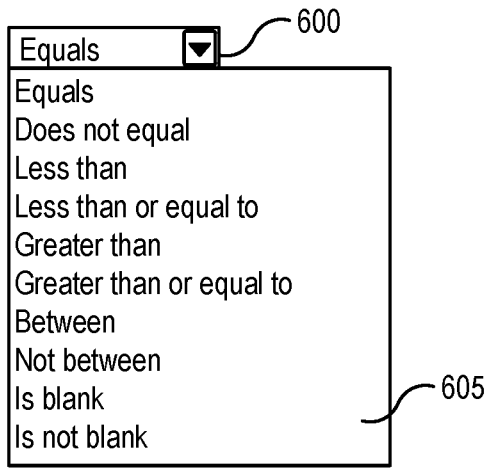
FIGS. 6A-6C are exemplary user interfaces including drop-down lists of natural language-like filter criteria according to various alternative embodiments of the present invention.
Figure 6B:
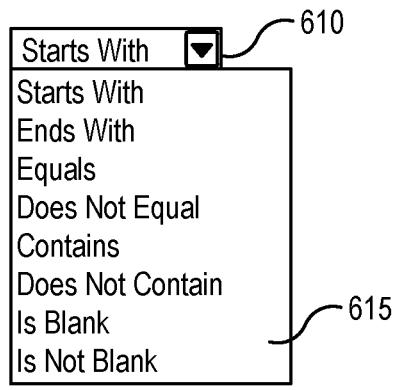
Figure 6C:
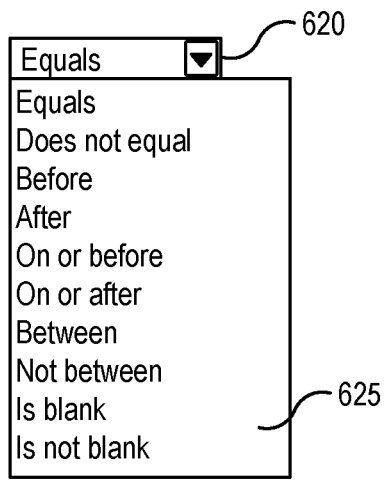

FIGS. 6A-6C are exemplary user interfaces including drop-down lists of natural language-like filter criteria according to various alternative embodiments of the present invention. As noted above, the filter conditions can be defined by or through a set of natural language-like descriptions for defining operators. For example, "Greater than" can be used instead of ">". FIGS. 6A, 6B, and 6C each illustrate an example of a choice list 600, 610, and 620 can be used to define criteria for a particular segment as outlined above. As shown here, choice lists 600, 610, and 620, upon selection, can present a list 605, 615, and 625 of operators or conditions from which the user can select for a particular segment. As with other elements of the interface, the conditions presented in lists 605, 615, and 625 for a segment can be presented dynamically at the time of instantiating the user interface and/or throughout usage of the user interface and based on a model or other definition of the dataset.

Figures 7, 8:
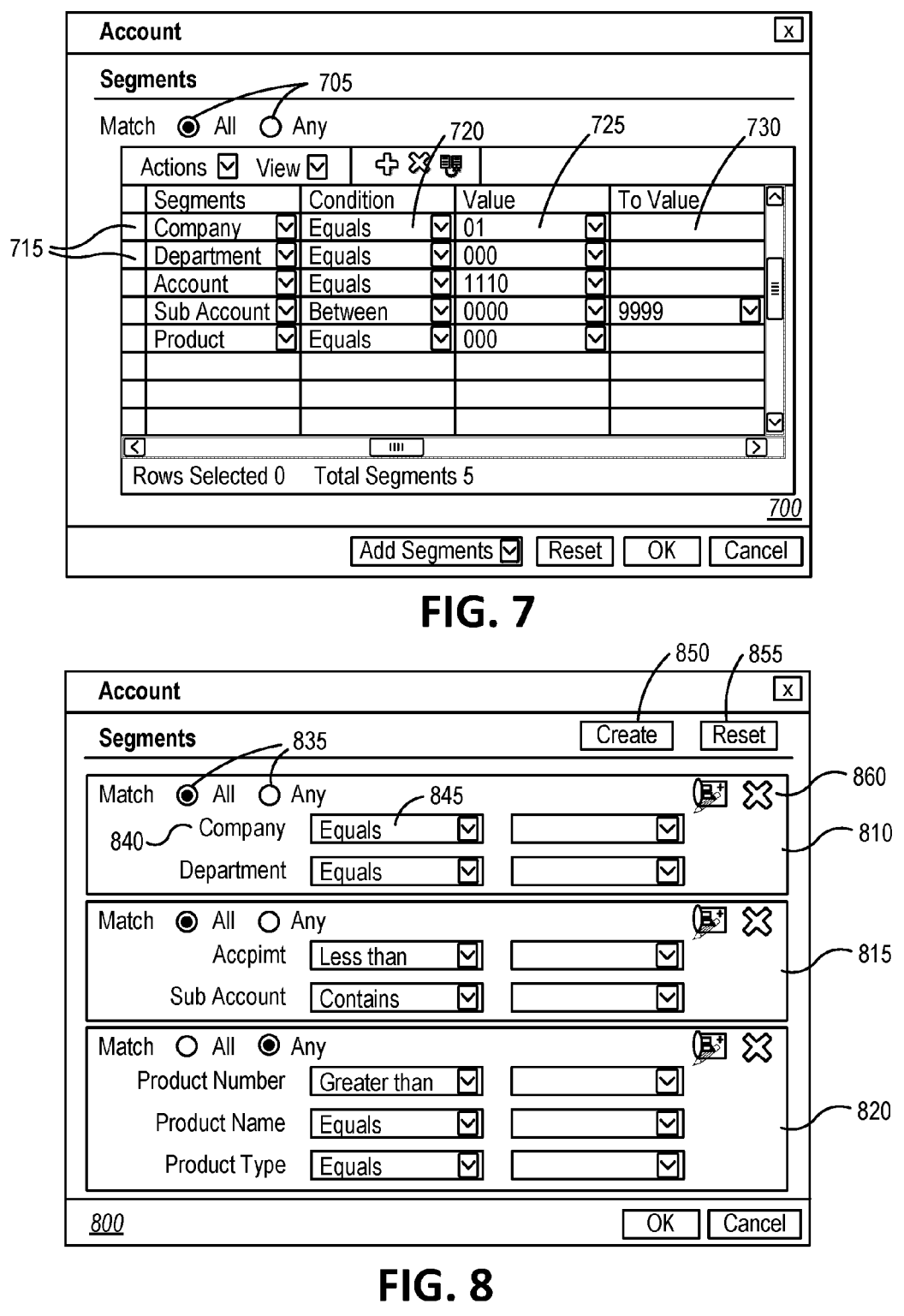

FIG. 7 is an exemplary user interface including a filter dialog box according to an alternative embodiment of the present invention. This example illustrates a dialog box 700 that uses a more traditional filter table design but with additional elements. For example, the dialog box 700 can include a set of radio buttons 705 for selecting an "All/Any" criteria, i.e., for indicating whether the filter should match all or any of the specified conditions. The dialog box 700 here also includes a list of segments 715 and one or more choice lists 720, 725, and 730 for each segment through which criteria for that segment may be defined. For example, each segment may include a choice list 720 for selecting a natural language-like condition and one or more choice lists 725 and 730 for selecting or defining values and/or ranges. Thus, even though using a traditional format, the dialog box 700 provides for access to available filter conditions using natural language-like conditions and through a user interface available as a re-usable component. The conditions presented in each list can be provided dynamically based on a model and/or code defining the dataset.

FIG. 8 is an exemplary user interface including a filter dialog box according to another alternative embodiment of the present invention. More specifically, this example illustrates a dialog box 800 in which a number of defined criteria groups 810, 815, and 820 can be presented. Each criteria group 810, 815, and 820 can include a set of radio buttons 835 for selecting an "All/Any" criteria, a list of segments 840 in that group, and one or more choice lists 845 for each segment through which criteria for that segment may be defined. In this way, multiple filters can be defined within a given filter thus allowing for complex filtering from within a single component.

According to one embodiment, the criteria groups 810, 815, and 820 may be presented by default, for example based on a model or other definition of the dataset and the hierarchy thereof. Additionally or alternatively, one or more groups may be added by clicking or selecting a "Create Group" button or control 850 which can cause display of a dialog to add and edit more segments. In another implementation, the edit button can actually be a +button/icon or butcon that is equivalent to an "Add Segments" menu. Additionally or alternatively, groups can be removed by clicking or selecting a reset button or control 855 to return the groups to the default segments, condition, and values, i.e., based on the model or definition for the dataset, or by clicking or selecting an icon 860 or button to remove individual groups.

FIG. 9 is an exemplary user interface including a filter dialog box according to yet another alternative embodiment of the present invention. This example illustrates a user interface including a set of text boxes 905 and 910 and a choice list 915 for defining the dataset and other search criteria. Additionally, the interface includes a box 900 with a set of radio buttons 920 for selecting an "All/Any" criteria. In this embodiment, the box 900 also includes a table 935 including a set of filter widgets 925 inserted therein similar to other web widgets. Each filter widget 925 can also have one or more associated columns 930 of the table 935 that are definable by a user or developer.

FIG. 10 is an exemplary user interface including a filter widget embedded in a hide/show region according to another alternative embodiment of the present invention. This example illustrates a user interface including a set of text boxes 1005 and 1010 and a choice list 1015 for defining the dataset and other search criteria. Additionally, the interface includes a box 1000 with a set of selectable hide/show regions 1025 and 1035. In this example, one of the hide/show regions 1025 is shown or expanded to reveal a box 1030 similar to that described above with reference to FIG. 5C. In this way, a single interface can easily and compactly include multiple filters, for example, for different datasets listed in the selectable hide/show regions 1025 and 1035.

FIG. 11 is an exemplary user interface including a filter widget implemented as an embedded re-usable table according to yet another alternative embodiment of the present invention. This example illustrates a user interface similar to that of FIG. 10 but where the filter widget is embedded as a re-usable table 1105. The table 1105 here is also similar to that described above with reference to FIG. 7. As with other elements of the user interfaces described herein, the rows, columns, and contents of the table may be determined and presented dynamically based on a model or other definition of the dataset and the hierarchy thereof. Additionally, in some cases, columns and contents, e.g., a "Description" column, may be added programmatically and/or through setup or configuration interfaces for the application.

Also included are a set of icons 1110-1130 or other elements for controlling various aspects related to the table 1105 and filter. For example, a create icon 1110 can be included which, when clicked or otherwise selected or activated by the user can initiate the creation of a new filter group folder or a new table (not shown here) which can be another part of the filter or a sub-filter. In the case a new table is created, it may be represented as a tab or with another marker along with the original table 1105 within the interface or as a table (not shown here), e.g., below the original table 1105. An add icon 1115, upon selection by a user can initiate addition of a new row in the table for a new segment of the dataset. In such cases, the criteria for the new segment can be changed, for example, inline via a choice list. The icons 1110-1130 can also include a delete icon 1120. Selection or activation of the delete icon 1120 by the user can initiate the remove of currently selected segment(s) and/or filter group(s). A duplicate icon 1125 can also be included which, upon selection by the user, can initiate a copying of currently selected segment(s) and/or filter group(s). Additionally or alternatively, a maximize icon 1130 can, upon selection or activation by a user, initiate a change in the interface to cause the table 1105 to appear full screen. Again more, few, or different icons and/or other elements may be used in different implementations without departing from the scope of the present invention.

Figure 12:
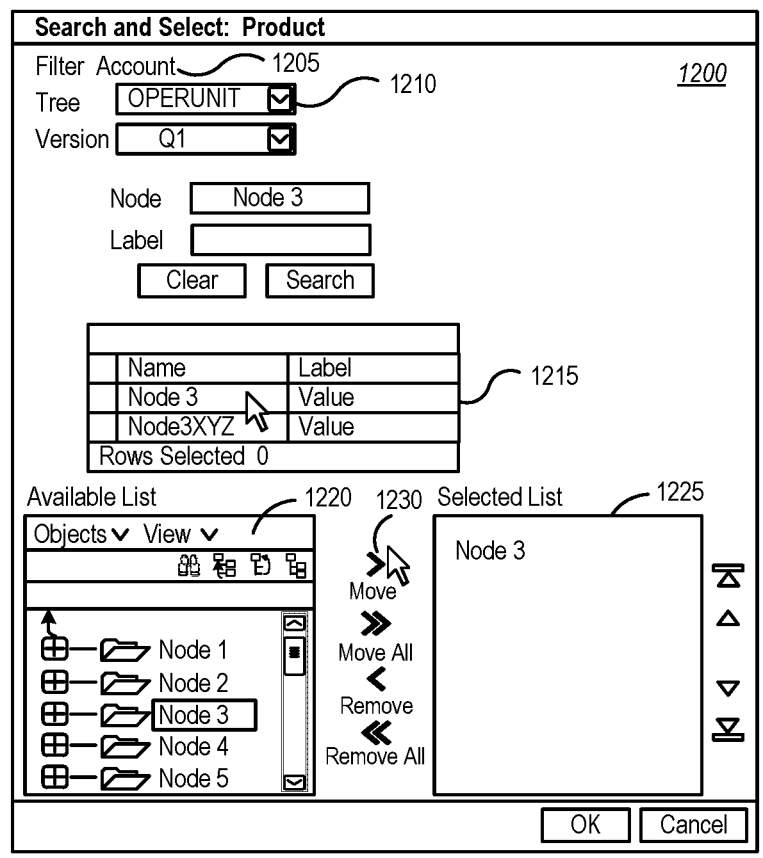
FIG. 12 is an exemplary user interface including a dialog box for defining filter conditions for filtering a tree structure according to an embodiment of the present invention.

FIG. 12 is an exemplary user interface including a dialog box for defining filter conditions for filtering a tree structure according to an embodiment of the present invention. This example illustrates a user interface including a dialog box 1200 which in turn includes text 1205 identifying a current filter and a set of choice lists 1210 for identifying the dataset. Additionally, the dialog box 1200 can include a table 1215 listing a set or subset of nodes of the dataset or tree based on the filter conditions selected via the choice lists 1210.

The dialog box 1200 can also include a pair of boxes 1220 and 1225 for facilitating selection of particular nodes. For example, an available list box 1220 can include a list or graphical representation of nodes available in the dataset. As shown here, this box 1220 can display the list of available nodes in a graphical manner such as in a directory type representation including files and folders. It should be noted that table 1215 and box 1220 represent a set or subset of the dataset based on the filter conditions selected via the choice lists 1210 and can thus comprise different views of the same thing. The dialog box here also includes a selected list box 1225 in which any currently selected nodes can be listed, e.g., by name. This selected node, e.g., "Node 3" here, can be included based on a selection in table 1215, i.e., based on values of selected name and label fields in this example, and/or in box 1220. Also included in the dialog box 1200 here is a set of controls 1230 to move selected nodes back and forth between the available list box 1220 and the selected list box 1225, i.e., to select and/or un-select nodes. Additional features, functions, and uses of such a dialog box 1210 will be described below.

Figure 13:
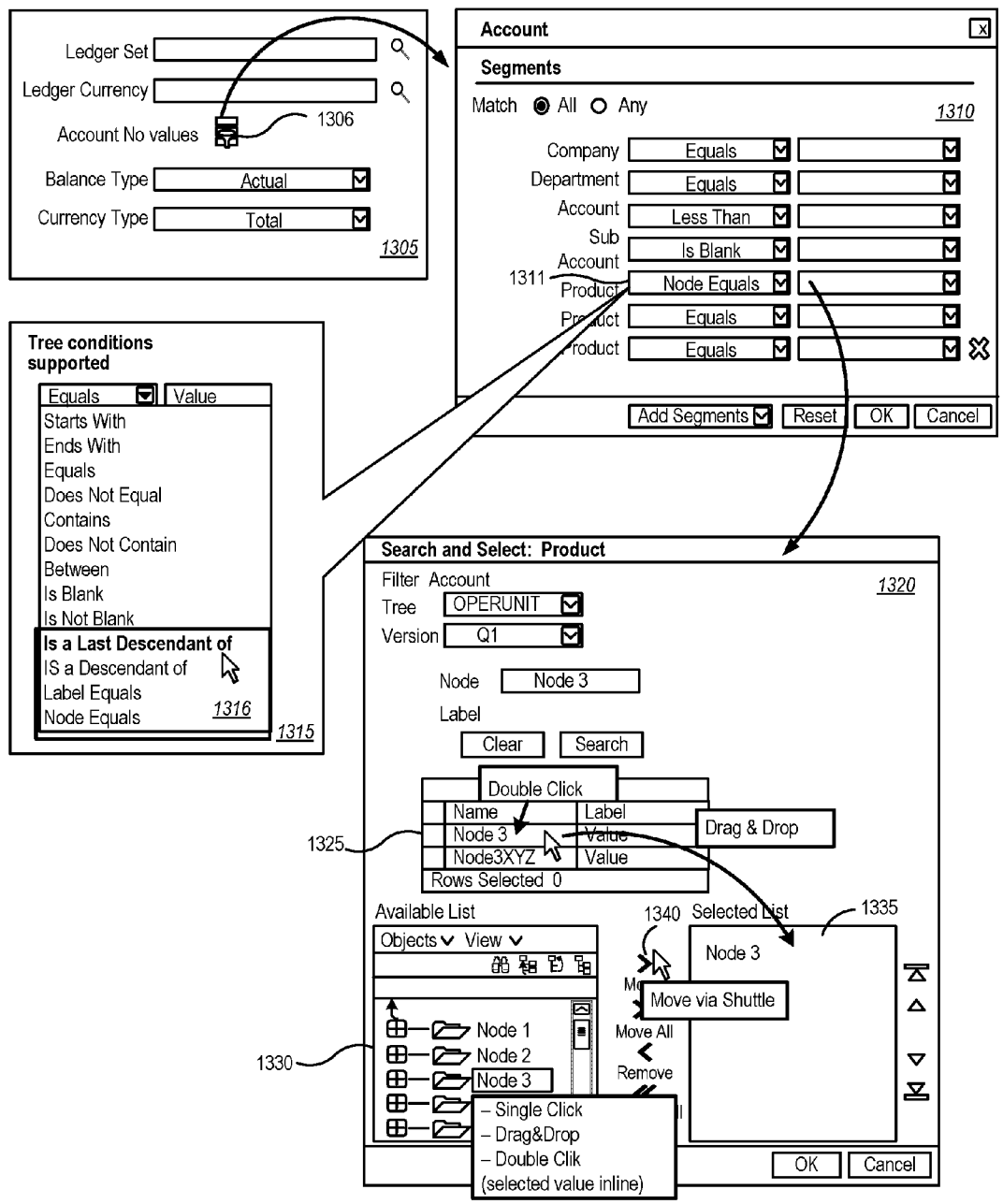
FIG. 13 is a sequence of exemplary dynamic user interfaces illustrating a process for performing filtering of a complex dataset according to one embodiment of the present invention.

FIG. 13 is a sequence of exemplary dynamic user interfaces illustrating a process for performing filtering of a complex dataset according to one embodiment of the present invention. More specifically, this example represents a sequence of dynamically and contextually updating a user interface with a number of different dialogs etc. for defining conditions for a filter based on a model and/or hard-coded definition of the dataset. In this example, the user interface initially includes a "search" page or other web page including a box 1305 or portion of the web page for defining search criteria as illustrated in FIGS. 4A and 4B and described above. As noted above, this page or box 1305 can include a filter widget icon 1306.

Upon selection of the filter widget icon 1306, e.g., by the user clicking with a mouse pointer or otherwise indicating the selection, the interface can be updated to display a condition selection dialog box 1310 such as illustrated in FIG. 5B and described above. In some cases, this condition selection dialog box 1310 can include a list of segments of the dataset identified through the search page or box 1305 and one or more choice lists for each segment through which criteria for that segment may be defined, e.g., choice list 1311 indicating a "Node Equals" condition for the "Product" segment. Also as noted above, these conditions can be selected from a set of natural language-like conditions 1315, for example as also illustrated in FIGS. 6A-6C and described above, and that can also include tree conditions 1316.

Upon a selection of one of the segments, e.g., by defining, selecting, or indicating a tree condition, the user interface can be updated to launch or display a node selection dialog box 1320 for further defining and/or selecting nodes of the tree such as the dialog box illustrated in FIG. 12 and described above. As noted above, the node selection dialog box 1320 can include a table 1325 listing a set of nodes of the dataset or tree selected. The node selection dialog box 1320 can also include a pair of boxes for facilitating selection of particular nodes, i.e., the available list box 1330 and the selected list box 1335. Also included in the node selection dialog box 1320 here is a set of controls 1340 to move selected nodes back and forth between the available list box 1330 and the selected list box 1335, i.e., to select and/or un-select nodes. So, nodes of the current tree can be added to the selected list in different ways. For example, a user may double-click a node from the table 1325 of nodes causing that node to be added to the selected list box 1335. In another example, the user may drag and drop a node listed in the table 1325 to the selected list box 1335. In other cases, the user may select a node in the available list box 1330 and single click, double click, drag and drop, and/or move via a shuttle function indicated by the set of controls 1340 to move selected nodes from the available list box 1330 to the selected list box 1340. Again, depending upon the exact implementation, other variations in the appearance and/or functionality of the user interfaces are contemplated and considered to be within the scope of the present invention.

Figure 14:
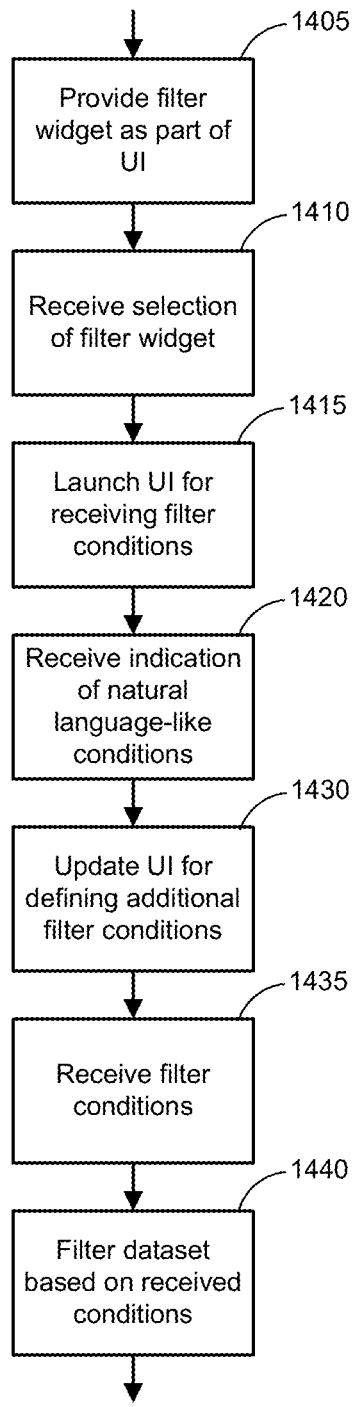
FIG. 14 is a flowchart illustrating a process for filtering of a complex dataset using dynamic user interfaces for defining conditions of a combination filter according to one embodiment of the present invention.

FIG. 14 is a flowchart illustrating a process for filtering of a complex dataset using a combination filter and dynamic user interfaces for defining filter conditions according to one embodiment of the present invention. In this example, filtering a complex dataset can begin with providing 1405 a filter widget control embedded in a user interface for an application, for example as described above with reference to FIGS. 4A and 4B. The filter widget can comprise a single, re-usable component for initiating a combination filter. For example, providing the filter widget control embedded in the user interface for the application can comprise displaying a syntax of current filter conditions in an abbreviated format. In such cases, details of the current filter conditions can be displayed in a hover window of the user interface in response to a selection of the current filter conditions, e.g., upon a mouse-over or other event. A selection of the filter widget control can also be received 1410 through the user interface, e.g., upon a click or other event. The user interface can be dynamically updated 1415 and one or more filter conditions for applying the combination filter to the complex dataset can be received 1420 through the updated user interface.

For example, updating 1415 the user interface for receiving the filter conditions can comprise displaying a dialog box including elements for selection of the filter conditions. In another example, updating the user interface for receiving the filter conditions can comprise displaying elements for selection of the filter conditions embedded in a table of the user interface. In yet another example, updating the user interface for receiving the filter conditions can comprise displaying elements for selection of the filter conditions embedded in a hide/show region of the user interface. Also as illustrated in the figures and discussed above, receiving the one or more filter conditions can comprise receiving an indication of a selected natural language-like condition. As described above, updating 1415 the user interface can be based on a model and/or hard-coded definition of the dataset and the user interface can be provided with conditions and values based thereon.

Based conditions received for the filter, the user interface can be dynamically updated 1430 again for receiving additional filter conditions. The additional filter conditions can be received 1435 through the updated user interface. For example, updating 1430 the user interface for receiving 1435 the filter conditions can comprise displaying a dialog box or other interface as described above and including elements for selection of the additional filter conditions. For example, updating the user interface for receiving the filter conditions can comprise displaying elements for selection of the filter conditions embedded in a table of the user interface. In yet another example, updating the user interface for receiving the filter conditions can comprise displaying elements for selection of the filter conditions embedded in a hide/show region of the user interface. Also as illustrated in the figures and discussed above, receiving the one or more filter conditions can comprise receiving an indication of a selected natural language-like condition. In some cases, tree filter conditions can comprise one or more conditions for selecting specific nodes from the hierarchy of the dataset. Such conditions for selecting specific nodes from the hierarchy of the dataset may further include multi-select conditions. Once received 1435, the combination filter can be applied 1440 to the dataset using the one or more filter conditions and the tree filter conditions.

It should be understood that updating 1430 the user interface and receiving 1435 additional conditions may be repeated any number of times. Additionally, updating 1430 the user interface and receiving 1435 additional conditions may be performed before or after applying 1440 the filter conditions. So for example, an initial set of filter conditions may be applied and then, additional filter conditions can be received and applied to the first set of results. However, each time the user interface is updated, and in any of the various forms illustrated herein, it can be updated dynamically based on a model for the dataset, a hard-coded definition of the dataset, or some combination of a model and hard-coded definitions for the dataset.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for filtering a dataset, the method comprising:
    providing, by a computer system, control elements in a user interface for an application, the control elements each comprising a re-usable filter component for initiating a combination filter wherein the filter component is dynamically adapted based on a model defining a plurality of segments within a Chart Of Accounts (COA) represented in the dataset and a hierarchy of the segments in the COA, the application comprising an application executing on a server, and wherein the user interface for the application is received by the computer system from the application;
    receiving, at the computer system, a selection of one of the control elements through the user interface;
    updating, by the computer system, the user interface with the filter component for receiving, through a first set of input elements, first filter conditions for applying the combination filter to the dataset, each input element of the first set of input elements being associated with a segment of the plurality of segments within the COA;
    receiving, at the computer system, through a first input element of the first set of input elements, a selection of a segment associated with the first input element;
    updating, by the computer system with the filter component, the user interface for receiving, through a second set of input elements, second filter conditions for applying the combination filter to the dataset, the second set of input elements being dynamically adapted based on the selection of the segment and the model defining the hierarchy of the segments in the COA, each of the input elements in the second set of input elements being associated with a node below the selected segment in the hierarchy of the segments in the COA;
    receiving, at the computer system, through the second set of input elements, one or more filter conditions; and
    applying the combination filter to the dataset by the computer system based on the model and using the one or more filter conditions.

2. The method of claim 1, wherein receiving the one or more filter conditions comprises receiving an indication of a selected natural language-like condition.

3. The method of claim 2, wherein the method further comprises:
    receiving, at the computer system, through the first set of input elements, one or more filter conditions, wherein the combination filter includes one or more filter conditions from the first set of input elements and one or more filter conditions from the second set of input elements.

4. The method of claim 3, wherein at least one of the first filter conditions comprises an indication of a selected natural language-like tree condition, and wherein at least one of the first set of input elements are presented for selection of the first filter conditions embedded in a hide/show region of the user interface, and wherein at least two of the second set of input elements are presented for selection of the second filter conditions embedded in a table of the user interface, and wherein selecting specific nodes from the hierarchy of the Chart of Accounts includes multi-select conditions, the method further comprising:
    receiving, at the computer system, an indication of a first new segment to add to the plurality of segments;
    modifying, by the computer system, the model defining the plurality of segments to include the first new segment;
    updating, by the computer system, the user interface with the filter component to add to the first set of input elements, a first new input element associated with the first new segment, wherein the plurality of segments is obtained from a first data source and the first new segment is obtained from a second data source;
    updating, by the computer system, the user interface to add to the first set of input elements, a second new input element for receiving a second new segment entered by a user; and
    saving the filter conditions and values for later use, wherein the filter conditions include an any/all selection for filtering.

5. The method of claim 3, wherein at least one input element of the first set of input elements allows entry of a tree filter condition, the method further comprising receiving at the computer system through the selected control element of the updated user interface the tree filter condition.

6. The method of claim 5, wherein receiving the tree filter condition comprises receiving an indication of a selected natural language-like condition.

7. The method of claim 6, further comprising applying the combination filter to the dataset by the computer system using the one or more filter conditions and the tree filter condition.

8. The method of claim 1, wherein providing the control elements in the user interface for the application comprises presenting a syntax of current filter conditions in an abbreviated format.

9. The method of claim 8, further comprising presenting by the computer system details of the current filter conditions in a hover window of the user interface in response to a selection of the current filter conditions.

10. The method of claim 1, wherein updating the user interface with the filter component for receiving the first filter conditions comprises presenting a dialog box including elements for selection of the first filter conditions.

11. The method of claim 1, wherein updating the user interface with the filter component for receiving the first filter conditions comprises presenting elements for selection of the first filter conditions embedded in a table of the user interface.

12. The method of claim 1, wherein updating the user interface with the filter component for receiving the first filter conditions comprises presenting elements for selection of the first filter conditions embedded in a hide/show region of the user interface.

13. The method of claim 1, wherein updating the user interface with the filter component for receiving the first filter conditions for applying the combination filter to the dataset comprises updating the user interface dynamically at the time of instantiating the user interface.

14. The method of claim 13, wherein updating the user interface dynamically is based on the model for the dataset or a combination of the model for the dataset and a hard-coded definition of the dataset.

15. A system comprising:
a processor; and
a memory communicatively coupled with and readable by the processor and having stored therein a sequence of instruction for filtering a dataset which, when executed by the processor, cause the processor to provide one or more control elements in a user interface for an application, the control elements each comprising a re-usable filter component for initiating a combination filter wherein the filter component is dynamically adapted based on a model defining a plurality of segments within a Chart Of Accounts (COA) represented in the dataset and a hierarchy of the segments in the COA, the application comprising an application executing on a server and wherein the user interface for the application is received by the system from the application, receive a selection of one of the control elements through the user interface, update the user interface with the filter component for receiving, through a first set of input elements, first filter conditions for applying the combination filter to the dataset, each input element of the first set of input elements being associated with a segment of the plurality of segments within the COA, receive through a first input element of the first set of input elements, a selection of a segment associated with the first input element, updating the user interface for receiving, through a second set of input elements, second filter conditions for applying the combination filter to the dataset, the second set of input elements being dynamically adapted based on the selection of the segment and the model defining the hierarchy of the segments in the COA, each of the input elements in the second set of input elements being associated with a node below the selected segment in the hierarchy of the segments in the COA, receive, through the second set of input elements, one or more filter conditions, wherein receiving the one or more filter conditions comprises receiving an indication of a selected natural language-like condition, and apply the combination filter to the dataset based on the model and using the one or more filter conditions.

16. The system of claim 15, wherein the instructions further cause the processor to receive, through the first set of input elements, one or more filter conditions, wherein the combination filter includes one or more filter conditions from the first set of input elements and one or more filter conditions from the second set of input elements.

17. The system of claim 16, wherein updating the user interface with the filter component for receiving the first filter conditions for applying the combination filter to the dataset comprises updating the user interface dynamically at the time of instantiating the user interface and wherein updating the user interface dynamically is based on the model for the dataset or a combination of the model for the dataset and a hard-coded definition of the dataset.

18. A computer-readable memory having stored thereon a sequence of instructions which, when executed by a processor, cause the processor to filter a dataset by:
providing one or more control elements in a user interface for an application, the control elements each comprising a re-usable filter component for initiating a combination filter wherein the filter component is dynamically adapted based on a model defining a plurality of segments within a Chart Of Accounts (COA) represented in the dataset and a hierarchy of the segments in the COA, the application comprising an application executing on a server and wherein the user interface for the application is received by the computer system from the application;
receiving a selection of one of the control elements through the user interface;
updating the user interface with the filter component for receiving, through a first set of input elements, first filter conditions for applying the combination filter to the dataset, each input element of the first set of input elements being associated with a segment of the plurality of segments within the COA, wherein updating the user interface with the filter component for receiving the first filter conditions comprises updating the user interface dynamically at the time of instantiating the user interface and wherein updating the user interface dynamically is based on the model for the dataset or a combination of the model for the dataset and a hard-coded definition of the dataset;
receiving through a first input element of the first set of input elements, a selection of a segment associated with the first input element;
updating the user interface for receiving, through a second set of input elements, second filter conditions for applying the combination filter to the dataset, the second set of input elements being dynamically adapted based on the selection of the segment and the model defining the hierarchy of the segments in the COA, each of the input elements in the second set of input elements being associated with a node below the selected segment in the hierarchy of the segments in the COA;
receiving through the second set of input elements, one or more filter conditions, wherein receiving the one or more filter conditions comprises receiving an indication of a selected natural language-like condition; and
applying by the computer system the combination filter to the dataset based on the model and using the one or more filter conditions.

19. The computer-readable memory of claim 18, further comprising:
receiving, through the first set of input elements, one or more filter conditions,
wherein the combination filter includes one or more filter conditions from the first set of input elements and one or more filter conditions from the second set of input elements.

* * * * *